US011146912B1

(12) United States Patent
Portocarrero et al.

(10) Patent No.: US 11,146,912 B1
(45) Date of Patent: Oct. 12, 2021

(54) SYSTEM AUTOMATICALLY UPDATING DATABASE INFORMATION BASED ON A USER'S SPECIFIED GEOGRAPHICAL LOCATION

(71) Applicant: Volo, LLC, Ormond Beach, FL (US)

(72) Inventors: Felipe Portocarrero, Ormond Beach, FL (US); Robert J Tuttle, Ormond Beach, FL (US); Charles Howard, Ormond Beach, FL (US)

(73) Assignee: VOLO, LLC, Ormond Beach, FL (US)

( * ) Notice: Subject to any disclaimer, the term of this patent is extended or adjusted under 35 U.S.C. 154(b) by 0 days.

(21) Appl. No.: 16/884,065

(22) Filed: May 27, 2020

(51) Int. Cl.
| | | |
|---|---|---|
| *H04W 4/02* | (2018.01) | |
| *H04W 4/021* | (2018.01) | |
| *H04W 4/029* | (2018.01) | |
| *G06F 3/0481* | (2013.01) | |
| *H04W 4/90* | (2018.01) | |
| *H04M 1/72424* | (2021.01) | |

(52) U.S. Cl.
CPC ........ *H04W 4/021* (2013.01); *G06F 3/04817* (2013.01); *H04M 1/72424* (2021.01); *H04W 4/029* (2018.02); *H04W 4/90* (2018.02)

(58) Field of Classification Search
CPC ....... H04W 4/021; H04W 4/90; H04W 4/029; H04M 1/72424; G06F 3/04817
See application file for complete search history.

(56) References Cited

U.S. PATENT DOCUMENTS

| | | | | |
|---|---|---|---|---|
| 7,444,238 B1* | 10/2008 | Opitz | ..................... | G01C 21/28 701/454 |
| 2002/0013153 A1* | 1/2002 | Wilcock | .................. | H04W 4/02 455/456.3 |
| 2002/0059266 A1* | 5/2002 | I'anson | .................. | G06Q 30/06 |
| 2006/0201964 A1* | 9/2006 | DiPerna | ................ | H04M 1/026 222/78 |
| 2020/0264628 A1* | 8/2020 | Gaal | ..................... | G06F 3/0481 |

OTHER PUBLICATIONS

"Geo-fense"—Wikipedia, the free encyclopedia [retrieved Jan. 15, 2021], Retrieved from Internet: <URL: https://en.wikipedia.org/wiki/Geo-fence> (Year: 2021).*

* cited by examiner

*Primary Examiner* — Nader Bolourchi
(74) *Attorney, Agent, or Firm* — Bayramoglu Law Offices LLC (57) ABSTRACT

A critical alert notification system includes a mobile device and software and is used to trigger a preselected communication scenario in the event an emergency scenario has been selected. The software includes a database and automatically updates information in the database when a user of the critical alert notification system crosses a preset geographic boundary or perimeter. Panic buttons or icons are swiped, tapped, clicked or pressed to alert people and organizations of an emergency situation with a preselected communication scenario. The critical alert notification system tracks the user's geographic location in real time and triggers two events when the user crosses a preset geographic boundary. The first event is the mobile user interface automatically adjusts to reflect key details based on their current location and the second event turns on the ability to display their location to other users of the system when a user enters a geographic boundary.

23 Claims, 6 Drawing Sheets

SYSTEM AUTOMATICALLY UPDATING DATABASE INFORMATION BASED ON A USER'S SPECIFIED GEOGRAPHICAL LOCATION

TECHNICAL FIELD

The present disclosure relates to a critical alert notification system. More specifically, the present invention automatically updates database information when a user crosses over a specified geographical perimeter or boundary.

BACKGROUND

Critical alert notification systems are used to trigger a preselected communication scenario in response to an emergency scenario being identified by the user of the system. The current state of technology of critical alert notification systems is manually updating an alerting software database to reflect a user's movements between multiple locations, such as an employee travelling between offices across town from each other. For example, a school or a business provides its employees with a mobile software or hardware application which the employee can carry with them throughout the day. This application is capable of triggering an alert in emergency situations such as an active shooter in the workplace. Once the alert is triggered, the application launches a predetermined communication scenario for the purpose of quickly alerting law enforcement as well as other employees and individuals in the vicinity to the threat. This communication scenario could include placing automated (e.g. computerized) telephone calls and sending text, emails or computer pop-up notices and other electronic messages to a predetermined list of recipients, such as law enforcement officials, local first responders, corporate managers and other employees who work in the same facility. These critical alert notification systems have traditionally been designed to be used by employees who remain in the same work location during the entire workday. In the above application, an alert triggered by any employee would trigger the default communication scenario which was programmed into the system by their company's administrator, under the assumption that the critical alert notification would only be initiated while the employee is located inside the company/school building, or within the boundaries of the company/school campus. This technology is adequate in situations where all employees remain in the same work location during the entire workday. However, problems arise in situations where an employee begins work at one corporate location (e.g. campus A) and then travels across town to a second corporate location (e.g. campus B). Specifically, campus A's communication scenarios, including a list of emergency contacts, a list of employees working at that location and other important aspects of the communication scenarios may be different than those of campus B. For the system to work correctly, the application's database would need to be updated to reflect the employee's new work location, thereby associating the employee with the campus communication scenarios tied to their new location. Under the existing technology, this issue is solved by either the employee or their manager taking responsibility for manually updating the alerting software database to reflect the employee's change of location (in this example, traveling from campus A to campus B). This process would have to be repeated with the database information being manually updated each time any employee changed their work location. If the employee or their manager neglects to update the alerting software database to reflect their new location, several serious problems could occur, such as the employee would receive notices related to their original location but would not receive notices related to their current location. Another serious problem would be if the employee used the application to initiate an alert, the application would launch the wrong communication scenario (i.e. the scenario tied to their original location and not their current location), which would result in the wrong campus receiving a false alert, while the correct campus' authorities, employees and managers would receive no alert. Therefore, manually updating an alerting software database can result in sending law enforcement officials or local first responders to an incorrect emergency location just because the software database was not updated with the moved/relocated employee's up to date location information.

Therefore, the present invention has solved the above problem and correctly sends the closest law enforcement officials or local first responders to the correct emergency location by automatically updating an alerting software database when a user physically crosses into or out of a preset geographic boundary or perimeter.

This new technology eliminates human error by automatically associating users of the application with the correct communication scenario for their current location by automatically updating the information in the alerting software database when a person enters into or exits from a preset geographic boundary or perimeter. The invention also automatically adds and removes user's/employee's information to/from the list of employees currently located at a location, ensuring they receive accurate information related to their location.

SUMMARY

An object of the present invention is to provide a system which automatically updates information in a database based on the system user crossing over a preset geographic boundary or perimeter. This system solves the technical problems of the above prior art as well as accurately, precisely and quickly notifies an appropriate agency and/or entity of a real time emergency situation.

Using a Global Positioning System (GPS), which is provided in or on a mobile device or equivalent device(s), the present invention's system can keep track of the system user's geographical location in real time. Within the software application of the system, geographic map polygon boundaries or perimeters can be drawn around an organization's various locations, creating a "geo-fence" around each facility or campus. Different communication scenarios can be associated with individual geo-fences. By referencing a database of geo-fence information, the mobile application system can automatically determine anytime users cross into or out of an organization's geo-fence boundary or perimeter. When the system of the application detects a change in a geo-fence location of a user, the system will automatically associate the user with this new location, thereby linking the user's application with that location's correct communication scenario. The user will also be associated with the database of employees currently located in the new location, ensuring that the employee will receive notices related to that facility while working within that facility.

The present invention's system includes software and databases. The software is comprised of multiple tools across different platforms including mobile platforms for both iOS and Android operating systems and a web-based HTML, platform. The system's user interface contains tools for programming the different communications scenarios, including who will be contacted, and what phrase(s)/language will be sent across various communication methods. Additionally, each location's geo-fence polygon can be programmed as well. The mobile application contains panic buttons/icons, map tools and message feeds for sending, monitoring and receiving alerts.

The present invention tracks the user's geographic location in real time and also will trigger two events when recognizing instances when the user crosses over a preset geographic boundary or perimeter (i.e. a "geo-fence").

The first event is the mobile user interface adjusts to reflect key details based on their current location automatically. When the user enters or leaves a geo-fence, the user interface changes to reflect their access or limited access to tools and features accordingly. For example, when the user leaves the preset geographic boundary or perimeter (i.e. a "geo-fence"), the user will disappear (i.e. not be shown) off the "live" map and therefore, the user will not be shown as being located in the preset geographic boundary or perimeter. Also, some or all of the panic buttons/icons can be disabled. In another embodiment, the panic button(s)/icon(s) may change due to an employee's or user's new location. For example, a manager in the corporate office in the United States may have access to more tools and buttons/icons in the system than the tools available to their employees in the United States corporate office. Should that same manager travel to the corporate office located in Germany, their access to the application would be restricted to that of an employee (not a manager), if they are not a manager at the office in Germany. Also, the buttons/icons displayed to the user will change due to the system detecting that the manager has crossed a geographic boundary or perimeter (i.e. a "geo-fence") and are now in the corporate office in Germany.

The second event is when a user enters into or leaves a geo-fence, the system responds by automatically updating the system database to reflect their new location. These changes are reflected in numerous ways within the system. For example, when the user enters a geographic boundary or perimeter (i.e. a "geo-fence"), the ability of the school, business or entity to monitor the user's location is turned on. When the user exits a geo-fence, location monitoring of the user is no longer available to the school, business or entity's management. Additionally, this new technology eliminates human error by automatically associating users with the correct communication scenario for their current location by automatically updating the database information when a person enters into or exits from a preset geographic boundary or perimeter. The invention also automatically adds and removes employee's information to/from the list of employees in the database currently located at a location when the user crosses over the preset geographic boundary or perimeter, ensuring they receive accurate information related to their current location.

In all of the description and disclosure, all buttons/icons can include a picture, and/or an image, and/or name(s), and/or different colors, and/or different shapes and the user can select as many buttons/icons as needed for his/her entities' perceived use or situation. Selecting the buttons/icons can be performed by swiping or by tapping the button(s)/icon(s) in the app interface/screen or by clicking on the button(s)/icon(s) in the web interface. Also, in the description and disclosure, an equivalent device can be used in place of (i.e. replacing) a mobile device.

The application is installed on a mobile device or equivalent device and a plurality of different icons are displayed/illustrated on the mobile devices' interface/screen by the use of the mobile application.

The application creates the display, via the mobile devices' interface/screen, of a plurality of different panic buttons/icons, where the buttons/icons include a picture, and/or an image and/or name(s) so the user can select as many icons as needed for his/her entities' perceived use or situation. For example, if the entity is a school, the user may choose the gun, the fire and the medical panic buttons/icons. However, the entity may choose more or less buttons/icons than in the above example. Also, the school, business or entity can program and/or develop their own panic buttons/icons, communication types and choose the people, organizations, departments, first responders and entities to be contacted when an emergency scenario is selected via the system. Since the system is flexible in allowing the school, business or entity to be able to select and change as needed the closest first responders to the location (i.e. closest first responders to the preset geographic boundary or perimeter) and/or those responders with an intimate familiarity with the location of the emergency situation, the emergency situation will be responded to in the fastest time possible since the correct and closest first responders will have been alerted. Therefore, the system has the potential to save lives over a system which does not select the first responders which are the closest to the location where the emergency situation is occurring. An example of a system which may not reliably send alerts to the first responders closest to the location of the alerting event would be any system where the critical alert notification application dials 911 directly from the user's cellular telephone. In that scenario the 911 dispatch who receives the call may not be the closest to the location of the caller, nor will the dispatch who receives the call always obtain accurate location details about the caller's location from the cellular telephone service provider. In these examples the failure to locate users who have placed calls directly to 911 via cell phone is the result of limits of current technology related to tracking cell phone location from cellular towers. Therefore, the present invention has solved the problem of contacting the closest and/or dedicated first responders and therefore, the emergency situation will be responded to in the fastest time possible and therefore, possibly save lives and property.

Also, the application provides for a plurality of different communication mediums to be associated with each event scenario associated with the various system panic buttons/icons. This allows the user to select the communication type(s) to be used for each different panic scenario. The system user may select voice calls, SMS Text, Email and/or computer pop ups for each of the selected panic buttons/icons. For example, if the user has selected voice calls, SMS Text and Email options when the gun panic button/icon is selected, then if an employee selects the gun panic button/icon, the user associated with the preset geographic boundary or perimeter where the gun panic button/icon was selected will receive a voice call, a SMS Text and an Email. Given below is an example showing how one can select different communication types for each different panic scenario. The user has selected a SMS Text for the scenario if the FIRE panic button/ion is selected and the user has also selected a voice call and an Email if the MEDICAL panic button/icon is selected. Therefore, if an employee swipes the FIRE button/icon, the users associated with the preset geographic boundary or perimeter where the FIRE panic button/icon was selected will receive a notification via SMS Text, whereby if the user swipes the MEDICAL button/icon, the users associated with the preset geographic boundary or perimeter where the MEDICAL panic button/icon was selected will receive a voice call and an Email notification.

The preset geographic boundary or perimeter (i.e. a "geo-fence") can be created from a plurality of polygonal or geometric shaped buttons/icons or can be drawn in the form of any desired shape by using a computer drawing device.

Additionally, during select emergency events the application can be programmed to display, via the mobile devices' interface/screen, of a plurality of safety status buttons/icons. For example, the choices via selectable buttons/icons of SAFE, NEED HELP and CANCEL are displayed on all user's mobile application interface screens after an "Active Shooter" panic button/icon has been triggered for their location. Therefore, the employee's current safety and status during a real time emergency can be monitored and also displayed to other users as being safe, needs help or is unknown.

The application creates the display, via the mobile devices' screen and via the HTML website screen, of a real-time live map illustrating the tracking locations, the safety status of the employees within a preset geographic boundary or perimeter, a listing of users within the preset geographic boundary or perimeter and the time and date the people within the listing last checked-in to the preset geographic boundary or perimeter.

The application enables a two-way live chat communication for individuals and group conversations.

Additionally, the system can integrate Internet of Things (IoT) devices such as smart locks, fire alarms, video cameras and shot detectors to be either controlled as part of an automated event scenario or to act as a remote trigger for an automated event scenario.

BRIEF DESCRIPTION OF THE DRAWINGS

In order to more clearly illustrate the embodiments of the present disclosure, a brief description of the drawings is given below. The following drawings are only illustrative of some of the embodiments of the present disclosure and for a person of ordinary skill in the art, other drawings or embodiments may be obtained from these drawings without an inventive effort.

DETAILED DESCRIPTION

The technical solutions of the present disclosure will be clearly and completely described below with reference to the drawings. The embodiments described are only some of the embodiments of the present disclosure, rather than all of the embodiments. All other embodiments that are obtained by a person of ordinary skill in the art on the basis of the embodiments of the present disclosure without an inventive effort shall be covered by the protective scope of the present disclosure.

In the description of the present disclosure, it is to be noted that the orientational or positional relation denoted by the terms such as "center", "upper", "lower", "left", "right", "vertical", "horizontal", "inner" and "outer" is based on the orientation or position relationship indicated by the figures, which only serves to facilitate describing the present disclosure and simplify the description, rather than indicating or suggesting that the device or element referred to must have a particular orientation, or is constructed or operated in a particular orientation, and therefore cannot be construed as a limitation on the present disclosure. In addition, the terms "first", "second" and "third" merely serve the purpose of description and should not be understood as an indication or implication of relative importance.

In the description of the present disclosure, it should be noted that unless otherwise explicitly specified and defined, the terms "install", "link" and "connect" shall be understood in the broadest sense, which may, for example, refer to fixed connection, detachable connection or integral connection; may refer to mechanical connection or electrical connection; may refer to direct connection or indirect connection by means of an intermediate medium; and may refer to communication between two elements. A person of ordinary skill in the art would understand the specific meaning of the terms in the present disclosure according to the specific situations.

The present invention of the system is described in detail below in reference to the figures.

FIGS. 1-6 illustrate the present invention.

The present invention is a critical alert notification system used to trigger a preselected communication scenario in the event that an emergency scenario has been selected. The critical alert notification system can be used by schools, businesses, churches, public run facilities or other entities. The general operation of the system is described in the below example.

For example, a school, business, church, public run facility or other entity provides its employees with a mobile device or equivalent device(s) and software application capable of triggering an alert in emergency situations such as an active shooter in the workplace. Once the alert is triggered, the application launches a predetermined communication scenario.

In all of the description and disclosure, all buttons/icons can include a picture and/or an image, and/or name(s), and/or different colors, and/or different shapes and the user can select as many buttons/icons as needed for his/her entities' perceived use or situation. Selecting the buttons/icons can be performed by swiping or by tapping the button(s)/icon(s) in the app interface/screen or by clicking on the button(s)/icon(s) in the web interface. Also, in the description and disclosure, an equivalent device can be used in place of (i.e. replacing) a mobile device.

The critical alert notification system is comprised of a device such as a mobile device or equivalent device(s) and software. The software includes a database and automatically updates information in the database when a user of the critical alert notification system crosses a preset geographic boundary or perimeter.

A preset geographic boundary or perimeter is defined as a geo-fence. The description and disclosure mostly recite a mobile device for using real time geospatial coordinate tracking to identify the geographic location of a system user. However, an equivalent device can be used in place thereof.

The device includes a geographic positioning information system such as a Global Positioning System (GPS). The GPS receives a signal with information from a GPS satellite and the geographic positioning information system provides geographic positioning information in real time to the mobile device or equivalent device(s). Therefore, the present invention's critical alert notification system can keep track of a user's geographical location in real time.

The software is comprised of multiple tools across different platforms including mobile platforms for both iOS and Android operating systems and a web-based HTML platform. The system contains a database and system tools for programming different "panic buttons" and their associated communication scenarios including who will be contacted and what information will be sent across various communication methods.

The database stores user's and other people's information as well as stores user's or other people's current location. For example, the database includes a list of user's current and last known locations, a preset geographic boundary or perimeter surrounding the monitored location (geo-fence) and the user's names, primary work and/or home location, telephone numbers, email addresses, occupation, photo, time last checked-in and recent safety status.

Figure 1:
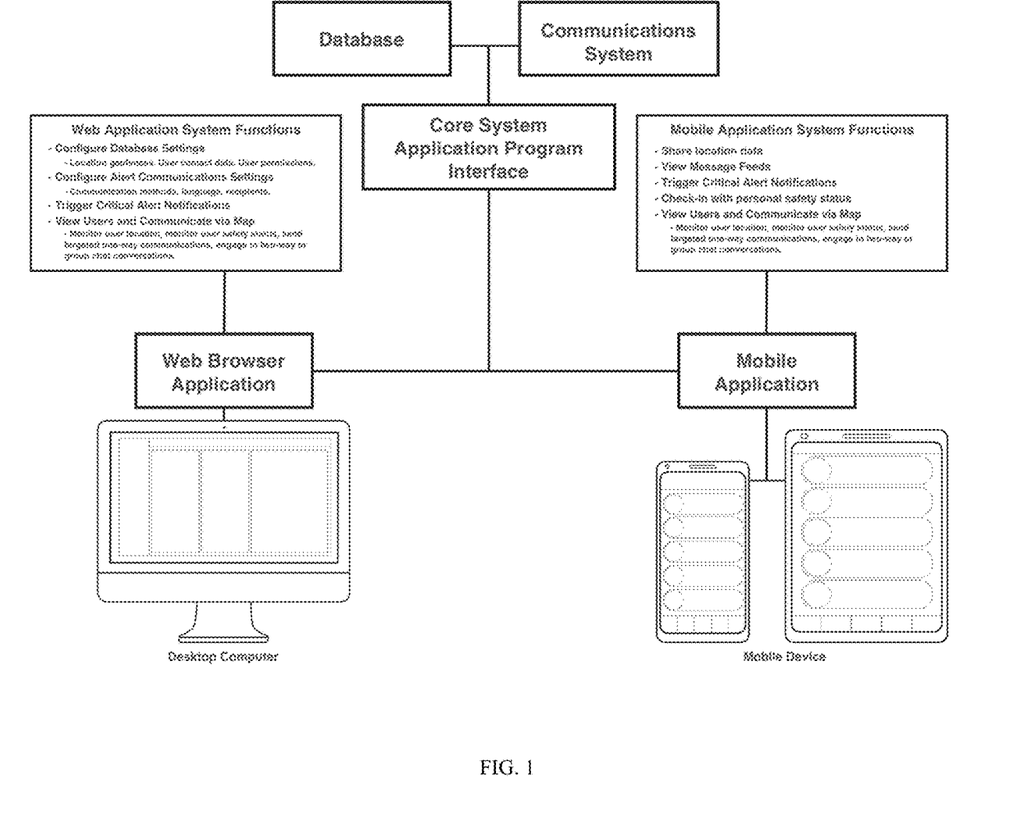
FIG. 1 is a diagram of the system showing communication between and functions of the different components of the system.

The critical alert notification systems' software can be installed as an app (i.e. application) on a mobile device or tablet or accessed via a web browser on laptop or desktop computers as shown in FIG. 1.

FIG. 1 shows the communication between and functions of the different components of the system. More specifically, the core system application program interface communicates with at least one database, communications systems such a voice calls, SMS Text, push notification, email, desktop popups or other equivalent methods, a web browser application and a mobile application. The web browser applications functions to configure the database(s) settings; to configure alert communication settings; trigger critical alert notifications; and view users and communicate via a map. The database(s) settings include(s) the location of the geo-fences, user contact data and user permissions to the different buttons/icons. The alert communication settings include communication methods; such as text, computer pop-ups, push notifications, e-mail, phone calls or other equivalent methods, language selections for text-to-speech translations, and recipients such as groups, assigned locations, individuals and geo-fence select users. The ways users interact with the software via the system map includes monitoring a user location; monitoring a user's safety status; sending targeted one-way communications; engaging in two-way or group chat conversations. The mobile applications function by sharing location data; viewing message feeds; triggering critical alert notifications; check-in with personal safety status and viewing users and communications via map(s), which includes monitoring a user location; monitoring a user's safety status; sending targeted one-way communications; engaging in two-way or group chat conversations.

The web browser application is provided on a computer and/or computer screen such as a desktop computer and/or screen. Features which are unique to the system's HTML Platform are as follows:
  Configuration (Add/Edit/Delete) of User Records;
  Configuration (Add/Edit/Delete) of Locations;
  Configuration (Add/Edit/Delete) of Location Geofences;
  Configuration (Add/Edit/Delete) of User Groups;
  Configuration (Add/Edit/Delete) of Panic Buttons (Per Location);
  Configuration (Add/Edit/Delete) of Message Scenarios;
  Configuration (Add/Edit/Delete) of User Administrator Roles; and
  Configuration (Add/Edit/Delete) of Administrator Permissions.

The mobile application is provided on any mobile device. Features which are unique to the system's Mobile Platform are as follows:
  View location privacy status (whether you're present in a geofence or not);
  Upload and change personal User avatar;
  Receipt of critical leart notifications to override "Do Not Disturb" or silent settings; and
  Check-in with status during critical events.

Additionally, features which are available on both HTML and Mobile Platforms are as follows:
  View all messages received in the system's message feed;
  Launch panic buttons based on location;
  View user locations on the map;
  View user check-in status (with timestamp);
  Send targeted outbound messages to selected users from the Map; and
  Engage in two-way or group live chat communications from the map or from a list.

Figure 2:
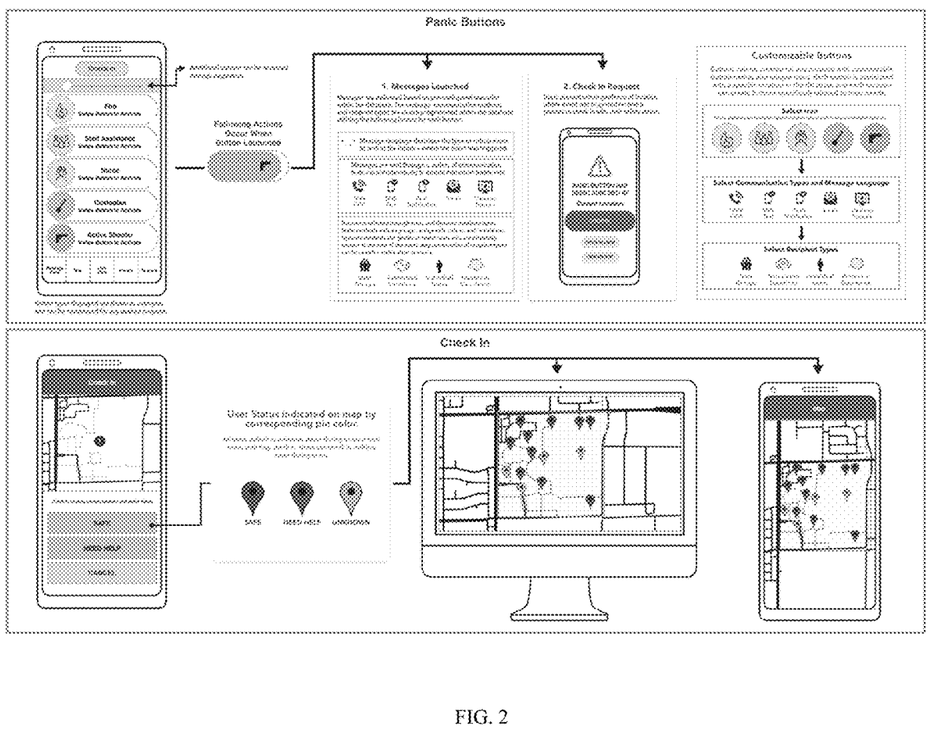
FIG. 2 is a diagram of the system showing the various buttons/icons and their associated functions and messages on a mobile device as well as a check in feature consisting of the status of users on the mobile device and a computer screen.

The mobile application contains panic buttons/icons, map tools and message feeds for sending, monitoring and receiving alerts as shown in FIG. 2. More specifically, FIG. 2 shows various buttons/icons and their associated functions and messages on a mobile device as well as a check in feature consisting of the status of users on the mobile device and a computer screen. As shown in FIG. 2, a plurality of different buttons/icons are displayed/illustrated on the mobile devices' interface/screen by the use of the mobile application. The plurality of panic button/icons can include FIRE, STAFF ASSISTANCE, SCHOOL NURSE, CUSTODIAN and ACTIVE SHOOTER. However, more and/or different panic buttons/icons can be displayed. These panic buttons/icons are the panic buttons/icons which will be swiped or tapped in the mobile app interface/screen or clicked-on or pressed in the web interface to initiate the associated stored communications scenario. Therefore, the triggering of an alert for an emergency situation is performed by swiping panic button(s)/icon(s) in the interface/screen or by tapping or pressing on the panic button(s)/icon(s) on a system interface screen. The term "triggering" is used broadly to include swiping panic button(s)/icon(s) or by tapping or pressing on the panic button(s)/icon(s) on a system interface/screen.

Figure 3:
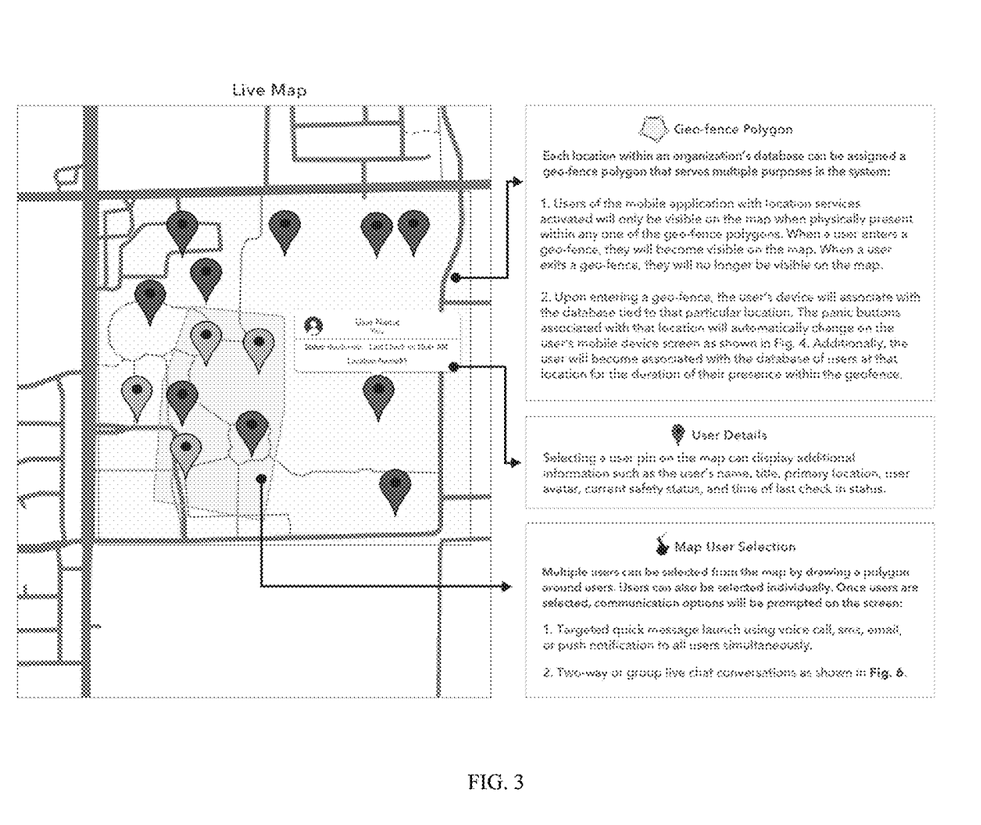
FIG. 3 is an illustration of the system showing a live map and associated information about a go-fence, user details and a map user selection of a user interface and/or mobile device.
Figure 4:
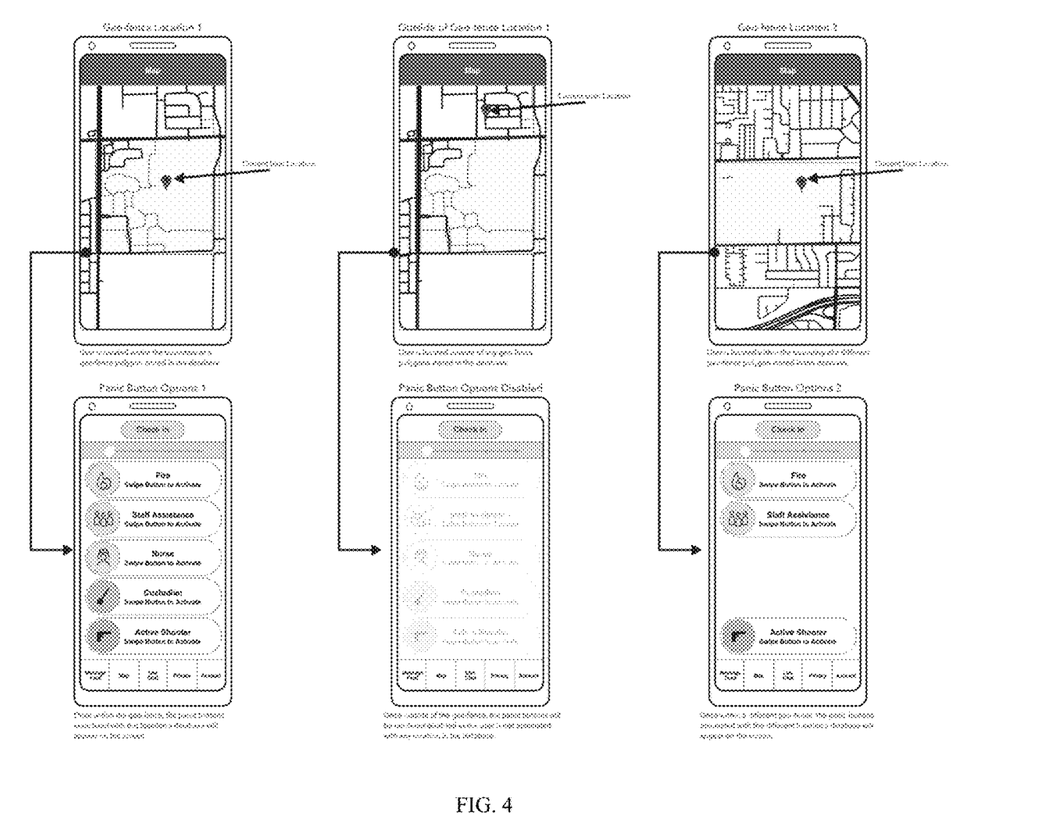
FIG. 4 is a diagram of various mobile app (i.e. application) screens showing the location of a user within the boundary and outside the boundary of a geo-fence and the various access options of the buttons/icons such as the various buttons/icons being visible and/or disabled to a user.

The organization(s) using the panic button system has/have a campus, a building or buildings or a geographic area or areas where their users are located. Therefore, a preset geographic boundary or perimeter can be designated around the organization's campus, building(s) or area(s) where their employees are located as shown in FIG. 2, FIG. 3 and FIG. 4.

FIG. 2 shows a plurality of different buttons/icons, which can be considered as panic button/icons, on a mobile device where additional buttons/icons can be accessed through pagination. FIG. 2 also shows that the following actions such as messages are launched and a check-in request is sent when any one or more of the panic buttons/icons are launched. These messages are delivered based on pre-configured scenarios with database(s). The verbiage, communication methods and recipient types are all pre-programmed within the database(s) utilizing the following factors for each button: message language describes the type of critical event as well as the location where the event was triggered; messages are send through a variety of communication methods simultaneously to ensure maximum awareness; and recipients are selected through static and dynamic database types. The static methods include groups, assigned locations and individuals. The dynamic methods include geo-fence select users who are physically present at the time of the event. Any combination of recipient types can be used for each button scenario. The check-in request is sent to users present within a geo-fence of a location where the event was triggered. The user receives a prompt to check in with their safety status. FIG. 2 additionally shows that the buttons/icons can be customizable. The buttons/icons can be created for any purpose with customizable button/icon names and unique icons. Each button/icon is associated with a specific location in the database(s) and each location can create buttons/icons specifically tailored to their needs.

Each of the organization's locations geo-fence perimeters can be programmed through the system platform. The geo-fence can be any shape. Furthermore, within the software application geographic fences or boundaries or perimeters can be defined by the inputting of geo location coordinates (i.e. latitude and longitude coordinates) using the system's user interface. These coordinates define the geo-fenced area surrounding an organization's various locations, creating a geo-fence around each facility or campus.

Different communication scenarios can be associated with individual locations as defined by their geo-fences. By referencing a database of geo-fence information, the system application can automatically determine anytime users cross into or out of an organization's geo-fence boundary or perimeter. When the system of the application detects a change in the location of a user which recognizes that user as having either moved out of or into a geo-fence perimeter, the system will automatically associate the user with their new location, thereby linking or unlinking the user's application with that location's communication scenario. The user will also be added to any database of users currently associated with the new location, ensuring that the user will receive notices related to their present location while they remain located there.

FIG. 3 shows a live map comprising a geo-fence polygon, users and user details and a map user selection. Each location within an organization's database can be assigned a geo-fence polygon that serves multiple purpose in the system such as users of the mobile application with location services activated will only be visible on the map when physically present within any one of the geo-fence polygons. When a user exits a geo-fence, they will no longer be visible on the map. Also, upon entering a geo-fence, the user's device will associate with the database tied to that particular location. The panic buttons/icons associated with that location will automatically change on the user's mobile device screen as shown in FIG. 4. Additionally, the user will become associated with the database of users at that location for the duration of their presence within the geo-fence.

Selecting at least one of the user pins (i.e. the upside-down water drops illustrated within the geo-fence in FIG. 3) on the map can display additional information such as the user's name, title, primary location, user avatar, current safety status and the time of last check in status.

Figure 6:
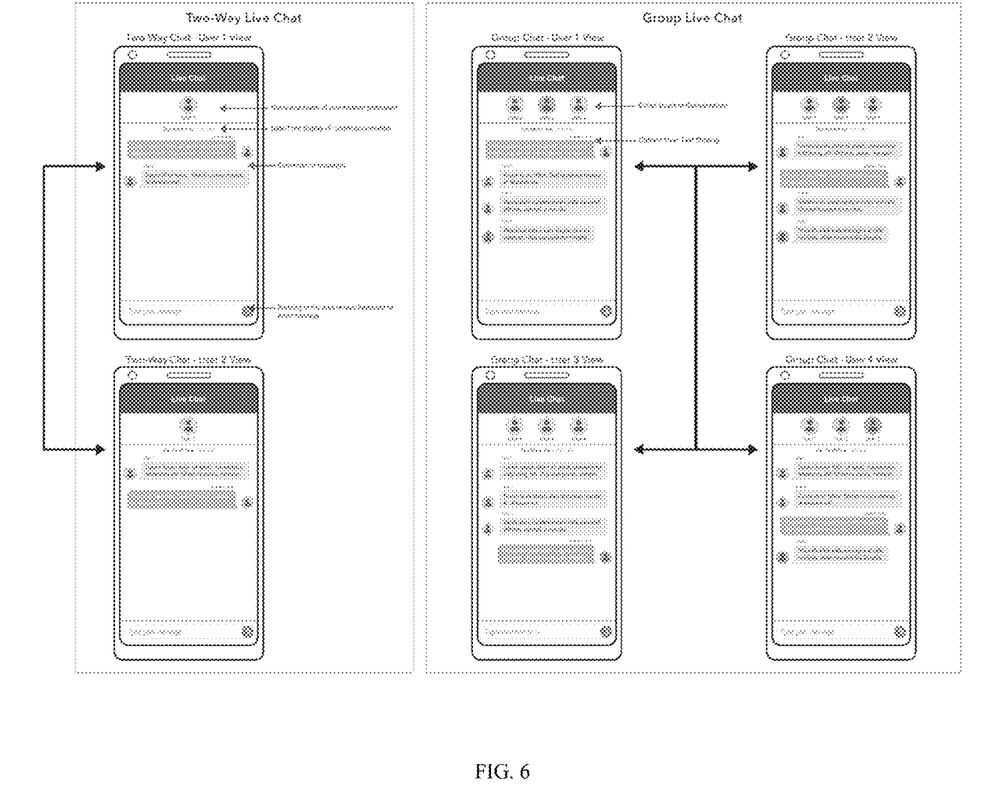
FIG. 6 is a diagram of various mobile app (i.e. application) screens illustrating examples of conversations in the two-way live chat and group live chat features of the invention.

The map user selection as shown in FIG. 3 is where multiple users can be selected from the map by drawing a polygon around users. Users can also be selected individually. Once users are selected, communication options will be prompted on the screen such as i) targeted quick message launch using voice call, SMS, email or push notification to all users simultaneously and ii) two-way or group live chat conversations as shown in FIG. 6.

The present invention tracks the user's geographic location in real time and also will trigger two events when recognizing instances when the user crosses over a preset geographic boundary or perimeter (i.e. a "geo-fence").

The first event is when a user enters into (or crosses over) a geographic boundary or perimeter (i.e. a "geo-fence"). When the user enters a geo-fence, the ability to monitor the user's location via the system mapping tool is turned on. This change will cause the user to appear (i.e. be shown) on the live map of FIG. 3. and as the mobile app in FIG. 4. Simultaneously, some or all of the panic buttons/icons displayed in the user's mobile application can be enabled to reflect the pre-programmed notification scenarios associated with the user's current geo-fenced location, as shown in FIG. 4. Also, in situations where a user exits one geo-fenced area and subsequently enters into a second (new) geo-fenced area, the buttons/icons may reappear, change or disappear, as shown in the bottom middle and right screens of FIG. 4, due to the system detecting the user having crossed into a new geo-fence with potentially different communication scenarios programmed for that location.

The second event is when the user enters into or exits a geographic boundary or perimeter (i.e. a "geo-fence") the system responds by automatically updating the system database to reflect their new location. These changes are reflected in numerous ways within the system. For example, when the user enters or exits a geo-fence, the mobile user interface adjusts automatically to reflect key details based on their current location as shown in FIG. 4. Accordingly, the user interface changes to reflect the user's modified or limited access to tools and features accordingly. For example, upon exiting a geo-fence some or all of the displayed panic buttons/icons can be disabled as shown in FIG. 4. Also, when the user leaves the geo-fence, the user will disappear (i.e. not be shown) from the live map of FIG. 3 and therefore, the user will no longer be shown as being located within the geo-fence. However, the system still monitors and tracks the location of the user outside the preset geographic boundary or perimeter (i.e. a "geo-fence") as indicated in FIG. 4.

As shown in FIGS. 1-5, the application creates the display, via the mobile devices' interface/screen, of a plurality of different panic buttons/icons, where the buttons/icons include a picture and/or an image and/or name(s) so the user can select as many buttons/icons as needed for his/her entities' perceived use or situation. For example, if the entity is a school, the user may choose the gun, the fire and the medical panic buttons/icons. Also, the school, business or entity can program and/or develop their own panic buttons/icons, communication types and the people, organizations, departments, first responders and entities to be contacted when an emergency is selected in the system. Since the system is flexible in allowing the school, business or entity to be able to program, select and/or change as needed the closest first responders to the location (i.e. the closest first responders to the preset geographic boundary or perimeter) of the emergency situation, the emergency situation will be responded to in the fastest time possible since the correct and closest first responders will have been alerted. Therefore, the system has the potential to save lives over a system which does not reliably select the first responders which are the closest to the location where the emergency situation is occurring. An example of a system which may not reliably send alerts to the first responders closest to the location of the alerting event would be any system where the critical alert notification application dials 911 directly from the user's cellular telephone. In that scenario the 911 dispatch who receives the call may not be the closest to the location of the caller, nor will the dispatch who receives the call always obtain accurate location details about the caller's location from the cellular telephone service provider. In these examples the failure to locate users who have placed calls directly to 911 via cell phone is the result of limits in technology related to tracking cell phone location from cellular towers. Therefore, the present invention has solved the problem of contacting the closest first responders and therefore, the emergency situation will be responded to in the fastest time possible and therefore, possibly save lives and property.

The application creates the display, via the mobile devices' interface/screen, of a Check In screen illustrating a plurality of different response options. The Check-In feature is activated when a user launches an Active Shooter panic button scenario. Once the scenario is launched, the system checks for all users currently present within the geo-fence for the location where the event was launched. The pins identifying all users on the map change to a grey color indicating an "Unknown" status. Each user is then sent a message prompt on their mobile device asking them to check in with their current safety status. The safety status options are "Safe" or "Needs Help". When a user checks in and provides their status via the mobile application, their current location is updated on the map and the color of their pin changes to reflect their status. The timestamp for the Check-In is also stored in the system and can be viewed by pressing or clicking the user's pin on the map. User's within the geo-fence can continue to use the Check-In feature as many times as they need to reflect their updated status throughout the duration of the event. The user pins are visible to other users who are present within the geo-fence to allow them to see any concentration of safe or dangerous areas on the map. The map to view the user pins is available on both the mobile app and the web platform.

Also, the application provides for a plurality of different communication mediums to be associated with each event scenario associated with the various "panic" buttons. This allows the user to select the communication type(s) to be used for each different panic scenario. The system user may select to send alert messages via any combination of voice calls, SMS Text, Email and/or computer pop ups for each of the selected panic buttons/icons. For example, if the user has selected voice calls, SMS Text and Email options when the "active shooter" panic button/icon is selected, then if an employee and/or user initiates the active shooter panic button/icon alert, the users associated with the preset geographic boundary or perimeter where the panic button/icon was initiated will all receive a voice call, a SMS Text and an Email. Given below is an example showing how one can select different communication types for each different panic scenario. The user has selected a SMS Text for the scenario if the FIRE panic button/ion is selected and the user has also selected a voice call and an Email if the MEDICAL panic button/icon is selected. Therefore, if an employee swipes the FIRE button/icon, the users associated with the preset geographic boundary or perimeter where the FIRE panic button/icon was selected will receive a notification via SMS Text, whereby if the user swipes the MEDICAL button/icon, the users associated with the preset geographic boundary or perimeter where the MEDICAL panic button/icon was selected will receive a voice call and an Email notification.

Additionally, the application creates the display, via the system's interface/screens, of a plurality of safety status icons as shown in FIG. 2. For example, the icons of SAFE, NEED HELP and UNKNOWN are displayed. Therefore, the employee's current status and status during a real time emergency is monitored and also displayed as being safe, needs help or the safety of the employee is unknown.

The application creates the display, via the system application interface/screen, of a real-time live map, as shown in FIG. 3, illustrating the tracking locations, the safety status of the employees within a preset geographic boundary or perimeter, a listing of people within the preset geographic boundary or perimeter and the time and date the people within the listing last checked-in via the system application.

The application enables a two-way live chat communication for individuals and group conversations. All users who can see other users on the map can select individuals or groups of users from the map to engage in private two-way live chat or group live chat conversations. The live chat system allows users within an organization to send real-time communications that update on their device as soon as a message is received. All conversations are stored in a conversation list and can be continued at any point in the future. The conversations utilize a persistent connection that allows each user the ability to see when other users are typing. The users who are participating in the conversation are listed at the top of each conversation along with an image that helps identify the user. Live chat conversations can be started by selecting a user or users from the map, or by selecting a user or users from a list of users within the organizations database.

Administrative users can select an individual user or multiple users from the system map to send targeted communications through a one-way outbound Quick Launch feature using any combination of communication types including voice calls, SMS text, email, and push notification.

Additionally, the system can integrate Internet of Things (IoT) devices such as smart locks, fire alarms, video cameras and shot detectors to be either controlled as part of an automated event scenario or to act as a remote trigger for an automated event scenario.

Figure 5:
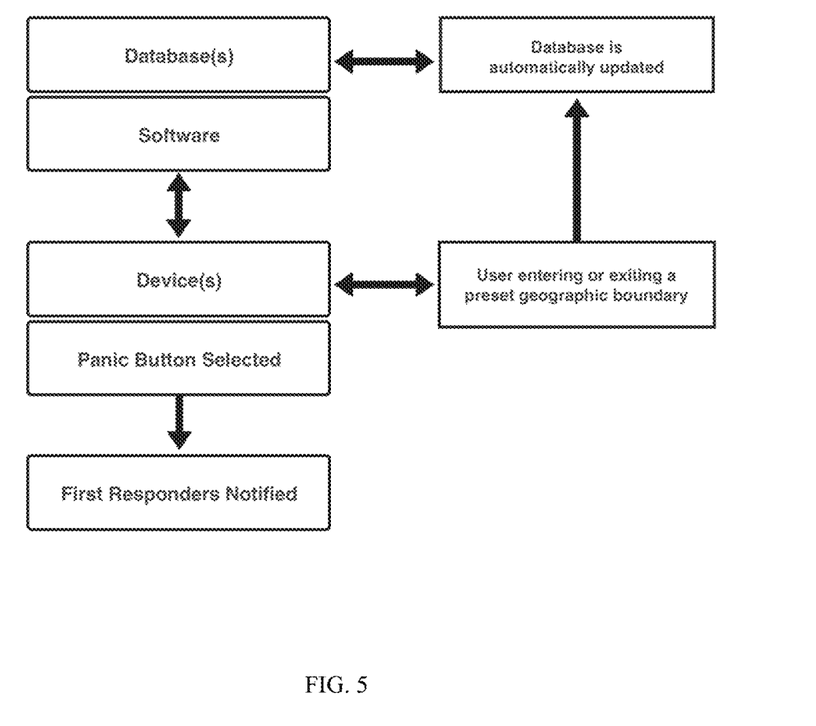
FIG. 5 is a flowchart of the system showing the interaction and communication of the user and a first responder between the different components of the system.

FIG. 5 is a flowchart of the system showing the interaction and communication of the user and a first responder between the different components of the system. As shown in FIG. 5, software is associated with and communicates with a database or databases. The software and the database or databases communicate with a device such as a mobile device, a tablet or in (e.g. the hard drive of) a laptop or a desktop computer. The device comprises a screen or interface displaying many different panic buttons/icons within the critical alert notification system application (app). The device incorporates and communicates with a GPS in order to determine when a person associated with the device enters or exits a preset geographic boundary or perimeter. When a person associated with the device enters or exits a preset geographic boundary or perimeter, the information and/or data in the database(s), which contains who is within the preset geographic boundary or perimeter, is automatically updated. Also, as shown in FIG. 5, when a panic button/icon is selected, a first responder or first responders is/are notified that an emergency situation is occurring in the preset geographic boundary or perimeter to which the person who activated the panic button/icon is within.

FIG. 6 a diagram of various mobile app (i.e. application) screens illustrating examples of conversations in the two-way live chat and group live chat features of the invention. The two-way live chat feature of the invention allows two users to type and communicate with each other in real time (i.e. live). The group chat feature of the invention allows each user of a plurality of users to type and communicate among any user or users of the plurality of users in real time (i.e. live). These two-way live chat and group live chat features are available on both HTML and Mobile Platforms.

The preferred embodiments of the present invention are described as above. It should be understood that the present invention is not limited within the description disclosed by the present invention and is not considered to exclude other embodiments, but can be applicable to various other combinations, modifications, and environments. Moreover, the present invention can be modified within the scope of the concept of the present invention, according to the above-mentioned teachings or the technology and knowledge in the related art. Various changes and modifications made by those skilled in the art, without departing from the spirit and scope of the present invention, are intended to be within the scope of protection as defined by the appended claims of the present invention.

What is claimed is:

1. A system comprising:
a database;
at least one device carried by at least one user;
software installed on the device, wherein the software includes the database and configured to automatically update information in the database and is communicably coupled to the database and the device receives geographic positioning information in real time;
a first event and a second event are triggered when the system recognizes the at least one user crosses over a preset geographic boundary or perimeter;
wherein the first event is
when the at least one user leaves the preset geographic boundary or perimeter at least one panic button/icon is automatically disabled on an interface or a screen of the device and
when the at least one user enters the preset geographic boundary or perimeter at least one panic button/icon is automatically enabled on the interface or the screen of the device in order to reflect pre-programmed notification scenarios associated with the at least one user's current location; and
wherein the second event is
when the at least one user leaves or enters the preset geographic boundary or perimeter information in the database is automatically updated or
when the at least one user enters the preset geographic boundary or perimeter an ability to monitor the location of the at least one user is automatically turned on and
when the at least one user leaves the preset geographic boundary or perimeter the location monitoring of the at least one user is no longer available.

2. The system according to claim 1, wherein the device is selected from the group consisting of: a cell phone, a tablet, a mobile device with both Global Positioning System (GPS) location capability and cellular and/or Wi-Fi™ communication capability, and a computer.

3. The system according to claim 1, wherein a Global Positioning System (GPS) provides the geographic positioning information in real time to the device, and wherein the device is a mobile device.

4. The system according to claim 1, wherein the interface or the screen displays the panic buttons/icons and the panic buttons/icons are configured to either be swiped in the interface or the screen of the device or tapped, clicked, or pressed.

5. The system according to claim 1, wherein, based on a triggered alert received by the device, the device sends a preselected communication scenario information to predetermined organizations, individuals and users.

6. The system according to claim 1, wherein the first event is when the at least one user leaves the preset geographic boundary or perimeter one or more of the panic buttons/icons are automatically disabled.

7. The system according to claim 1, wherein the preset geographic boundary or perimeter is formed by the at least one user creating a perimeter of three or more geopositioned points which display on a map display of the interface or the screen of the device.

8. The system according to claim 1, wherein the preset geographic boundary or perimeter is created by the at least one user drawing a polygonal, a freeform or a geometric shape around an organization's campus or building as displayed on a map, wherein the map is displayed on the screen or the interface of the device.

9. The system according to claim 1, wherein the first event is when the at least one user leaves the preset geographic boundary or perimeter all of the panic buttons/icons are automatically disabled.

10. The system according to claim 1, wherein the second event is when the at least one user leaves or enters the preset geographic boundary or perimeter the information in the database is automatically updated.

11. The system according to claim 1, wherein the second event is when the at least one user enters the preset geographic boundary or perimeter the ability to monitor the location of the at least one user is automatically turned on and when the at least one user leaves the preset geographic boundary or perimeter the location monitoring of the at least one user is no longer available.

12. The system according to claim 1, wherein the device is a cell phone.

13. The system according to claim 1, wherein the device is a mobile device and the interface displays a plurality of user safety status buttons/icons based on communication scenario information.

14. The system according to claim 13, wherein when at least one of the plurality of user safety status buttons/icons is triggered, the system checks for all users currently present within the preset geographic boundary or perimeter and the interface displays pins representing all the users on a map, wherein the system changes the display color of the pins to indicate an "Unknown" status, wherein each user within the preset geographic boundary or perimeter is sent a message prompt on the users device asking the users to check in with their current user safety status.

15. The system according to claim 14, wherein user safety status options are "Safe" or "Needs Help" and when at least one of the users checks in and provides their current user safety status, their current location is updated on the map and the color of their pin changes to reflect their current user safety status.

16. The system according to claim 1, wherein the system integrates with Internet of Things (IoT) devices.

17. The system according to claim 16, wherein the Internet of Things (IoT) devices consist of one or a combination of smart locks, fire alarms or shot detectors.

18. The system according to claim 1, wherein the device is a mobile device and the interface displays a real-time live map showing each user and each user's safety status within the preset geographic boundary or perimeter.

19. The system according to claim 1, wherein the device is a computer comprising an interface and the interface of the computer displays a real-time live map showing each user and each user's safety status within the preset geographic boundary or perimeter.

20. The system according to claim 18, wherein the real-time live map includes a list of user tracking locations showing changes in the user location for each user, the user safety status of the user within the preset geographic boundary or perimeter, and a listing of the plurality of users within the preset geographic boundary or perimeter.

21. A system comprising:
a database;
at least one device carried by at least one user;
software installed on the device, wherein the software includes the database and configured to automatically update information in the database and is communicably coupled to the database and the device receives geographic positioning information in real time;
a first event and a second event are triggered when the system recognizes the at least one user crosses over a preset geographic boundary or perimeter;
wherein the first event is
when the at least one user leaves the preset geographic boundary or perimeter at least one panic button/icon is automatically disabled on an interface or a screen of the device and
when the at least one user enters the preset geographic boundary or perimeter at least one panic button/icon is automatically enabled on the interface or the screen of the device in order to reflect pre-programmed notification scenarios associated with the at least one user's current location; and
wherein the second event is the database is automatically updated by adding and removing at least one user's information to and from a list of users in the database currently located at a location when the at least one user crosses over the preset geographic boundary or perimeter.

22. A system comprising:
a database;
at least one device carried by at least one user;
software installed on the device, wherein the software includes the database and configured to automatically update information in the database and is communicably coupled to the database and the device receives geographic positioning information in real time;
a first event and a second event are triggered when the system recognizes the at least one user crosses over a preset geographic boundary or perimeter;
wherein the first event is when the at least one user leaves the preset geographic boundary or perimeter the at least one user will not be shown on a displayed live map and therefore, the at least one user will not be shown as being located in the preset geographic boundary or perimeter; and
wherein the second event is the database is automatically updated by adding and removing at least one user's information to and from a list of users in the database currently located at a location when the at least one user crosses over the preset geographic boundary or perimeter.

23. A system comprising:
a database;
at least one device carried by at least one user;
software is installed as an application on the device, wherein the software includes the database and configured to automatically update information in the database and is communicably coupled to the database and the device receives geographic positioning information in real time;
a first event and a second event are triggered when the system recognizes the at least one user crosses over a preset geographic boundary or perimeter;
wherein the first event is
when the at least one user leaves the preset geographic boundary or perimeter at least one panic button/icon is automatically disabled on an interface or a screen of the device and
when the at least one user enters the preset geographic boundary or perimeter at least one panic button/icon is automatically enabled on the interface or the screen of the device in order to reflect pre-programmed notification scenarios associated with the at least one user's current location; and
wherein the second event is the database is automatically updated to reflect the at least one user's new location and the application provides a plurality of different communication mediums to be associated with each one of a plurality of event scenarios, where the plurality of event scenarios are associated with the panic buttons/icons.

* * * * *